No. 787,050. PATENTED APR. 11, 1905.
E. MILLER.
GLASS MOLDING MACHINE.
APPLICATION FILED DEC. 6, 1904.

Witnesses
Benj. Finckel
Oda Eckstein

Inventor
Edward Miller
by Finckel & Finckel
his Attorneys

Fig. 2.

No. 787,050. PATENTED APR. 11, 1905.
E. MILLER.
GLASS MOLDING MACHINE.
APPLICATION FILED DEC. 6, 1904.

Witnesses
Benj. Finckel
Oda Eckstein

Inventor
Edward Miller
by Finckel & Finckel
his Attorneys

No. 787,050. PATENTED APR. 11, 1905.
E. MILLER.
GLASS MOLDING MACHINE.
APPLICATION FILED DEC. 6, 1904.

Witnesses
Benj. Finckel
Oda Eckstein

Inventor
Edward Miller
by Finckel & Finckel
His Attorneys

No. 787,050. PATENTED APR. 11, 1905.
E. MILLER.
GLASS MOLDING MACHINE.
APPLICATION FILED DEC. 6, 1904.

Witnesses
Benj. Finckel
Ida Eckstein

Inventor
Edward Miller
by Finckel & Finckel
his Attorneys

No. 787,050. PATENTED APR. 11, 1905.
E. MILLER.
GLASS MOLDING MACHINE.
APPLICATION FILED DEC. 6, 1904.

Witnesses
Benj. Finckel
Oda Eckstein

Inventor
Edward Miller
by Finckel & Finckel
his Attorneys

No. 787,050. Patented April 11, 1905.

UNITED STATES PATENT OFFICE.

EDWARD MILLER, OF COLUMBUS, OHIO.

GLASS-MOLDING MACHINE.

SPECIFICATION forming part of Letters Patent No. 787,050, dated April 11, 1905.

Application filed December 6, 1904. Serial No. 235,664.

*To all whom it may concern:*

Be it known that I, EDWARD MILLER, a citizen of the United States, residing at Columbus, in the county of Franklin and State of Ohio, have invented certain new and useful Improvements in Glass-Molding Machines; and I do hereby declare the following to be a full, clear, and exact description of the invention, such as will enable others skilled in the art to which it appertains to make and use the same.

The invention relates more particularly to that class of machines for molding glassware in which the charging, pressing, blowing, discharging, and mold-cooling operations are performed practically contemporaneously.

The invention has for its principal objects, first, to provide improved means for automatically and tightly locking the mold when the hot glass therein is subjected to the pressing operation; second, to provide improved means for raising and carrying the primary bottom while in the charged mold to the glass-pressing plunger; thirdly, to provide improved means for supporting the primary bottom of the mold while the glass therein is subjected to the pressing operation, and, fourthly, to make other improvements in the details of construction of such machines, whereby their operation is rendered easy, efficient, and mostly automatic.

In the accompanying drawings, of which there are six sheets and in which I have shown one embodiment of the invention.

In the views, 1 designates a column or stationary spindle on which is mounted rotatably the table that carries the blow-molds and primary bottoms. The table is comprised of two parts, to wit: an upper plate or table proper, 2, that carries the blow-molds, and a lower part or ring $2^a$, that carries the primary bottoms. The parts 2 and $2^a$ are secured together to constitute one structure by means of several appropriate brackets $2^b$. The table is rotated with an intermittent rotary motion by means of a pawl $3^a$ to engage the part $2^a$, pivoted on a large sleeve 3, loosely mounted on the spindle 1 below the ring $2^a$, the necessary rotary reciprocating movements being imparted to it by means of an air-cylinder 4, the piston-rod $4^a$ of which is connected, by means of a link $4^b$, with the sleeve 3.

There will preferably be five of the blow-molds mounted on the table 2—one for charging, one for pressing, one for blowing, one for discharging, and one that is allowed to cool preparatory to charging, so that the operations of charging, pressing, blowing, and discharging and cooling can proceed simultaneously. The blow-molds are arranged equidistantly apart on the table—that is, about seventy-two degrees apart around the margin of the table—and the table will be rotated with an intermitting movement through corresponding arcs, so as to bring a pair of the molds successively and simultaneously under the plunger 5 and the blower 6, as hereinafter described.

Figure 1:
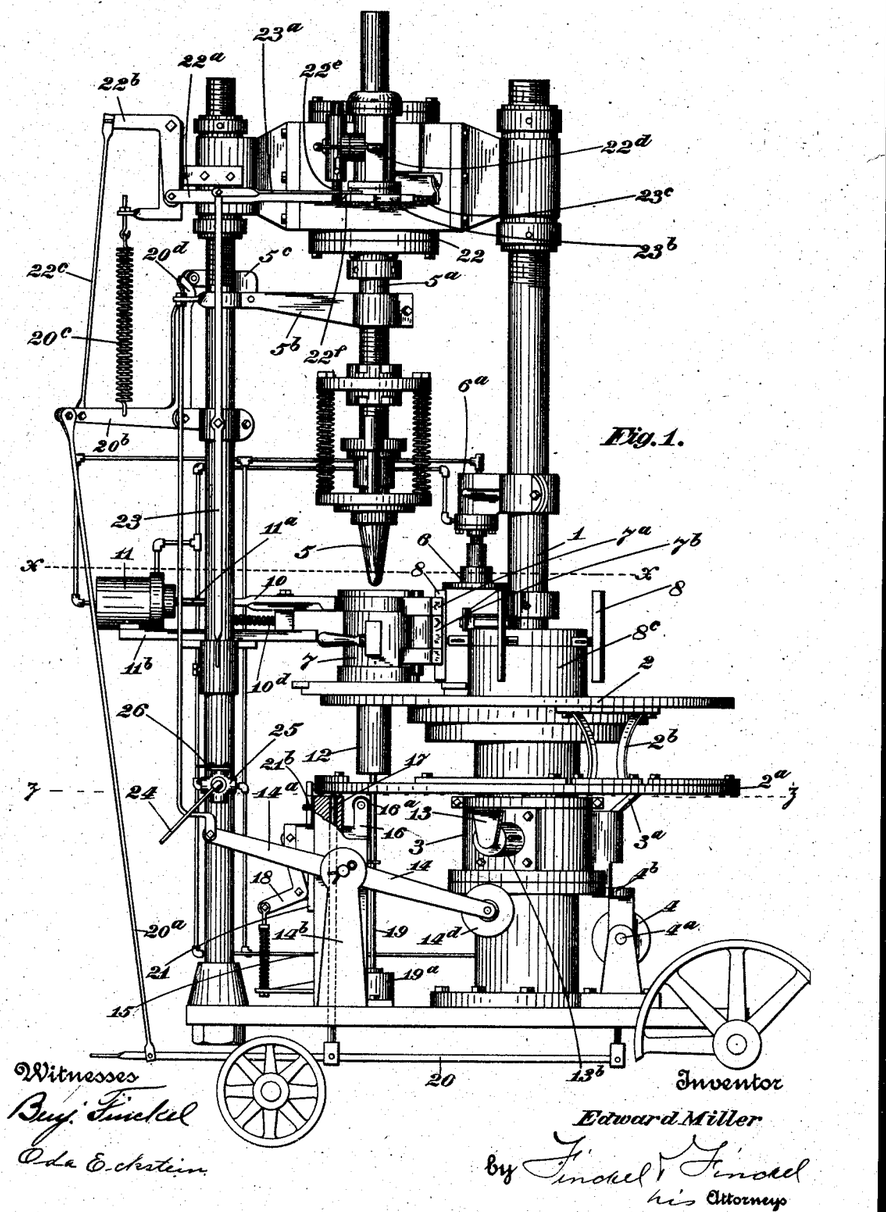
Figure 1 is a general view in side elevation with parts omitted for the sake of clearness.
Figure 2:
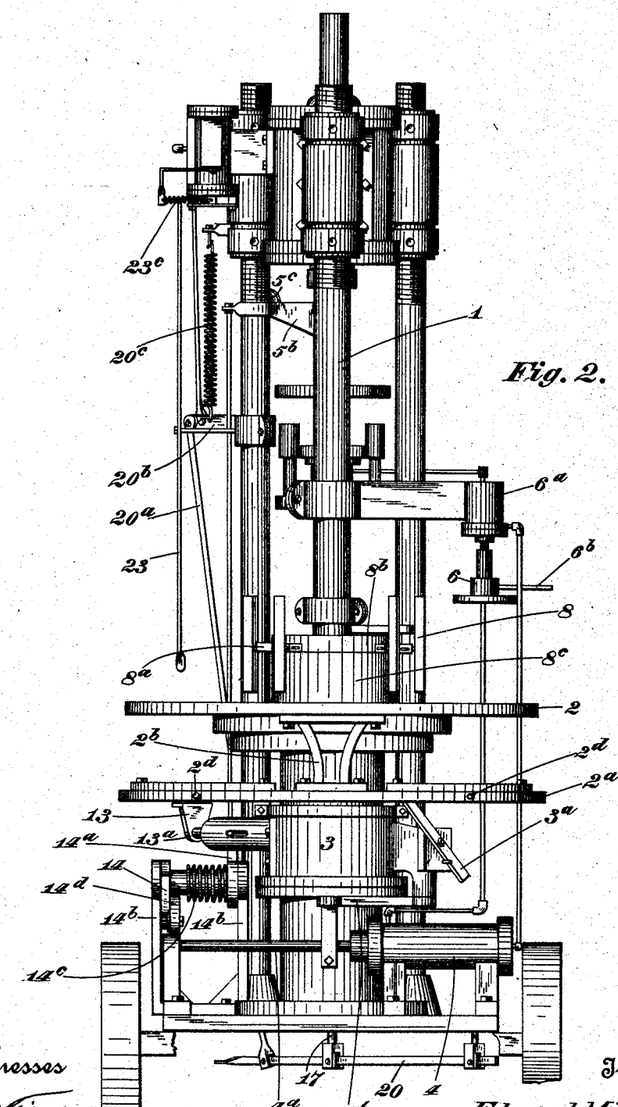
Fig. 2 is a general view in elevation looking at the right-hand side as seen in Fig. 1, also with parts omitted.
Figure 3:
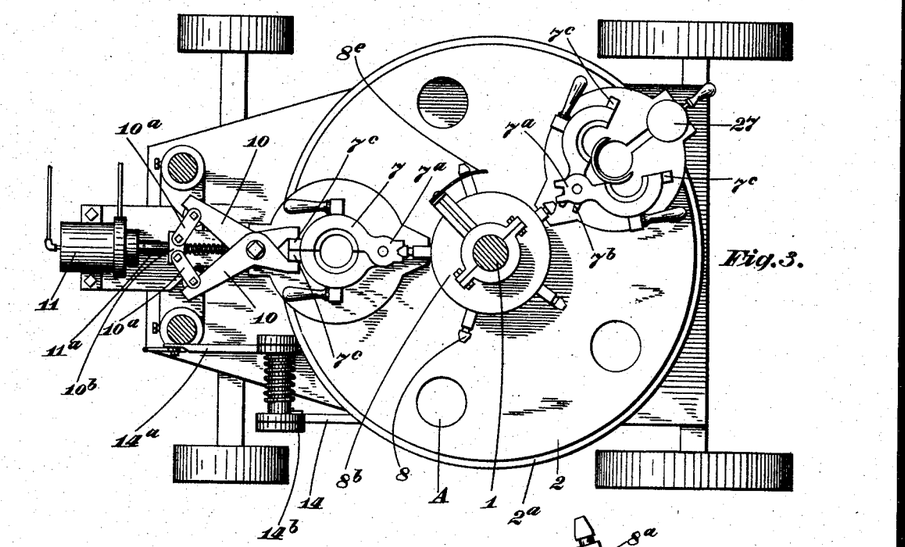
Fig. 3 is a section and plan view looking down from the horizontal planes $xx$, Fig. 1.
Figure 4:
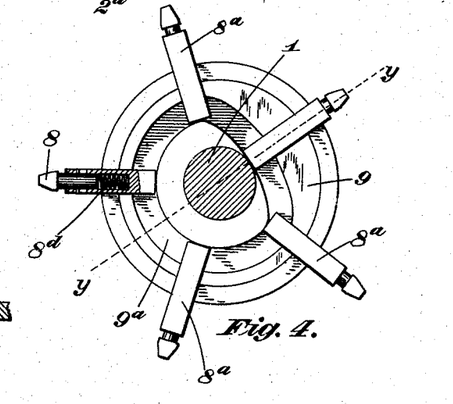
Fig. 4 is a detail view, partially in section, of the devices for locking at their inner ends the blow-molds in closed position.
Figure 5:
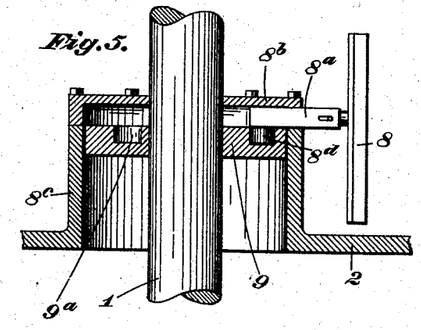
Fig. 5 is a vertical sectional view of the same on the plane $yy$ and partially in full lines.

The blow-molds, which are designated 7, (and two of which only are shown in Fig. 3,) are comprised generally, as usual, of two halves or sections formed on their inner sides to give the desired shape to the article to be molded hinged together at their inner ends on a pin secured on the table 2. The two sections of the mold each have at their inner ends notched projections $7^a$ and $7^b$, which when the sections are closed upon each other are brought into alinement, and into the notches of these projections when alined are pushed locking wedges or keys 8. The locking-wedges 8 have shanks that are carried by arms $8^a$, sliding radially in openings in a plate $8^b$, that is screwed to a cylindrical hub $8^c$, moving with the table 2; but the inner ends of these arms $8^a$ are provided with downwardly-extending pins $8^d$, that enter a cam-groove $9^a$ in a stationary plate 9, secured on the spindle 1. The shanks of the wedges 8 are backed by springs $8^d$, that tend to hold them yieldingly outward. The cam-groove $9^a$ is of such form that all the wedges are held outward in locking position, except that of the mold in discharging position, which wedge is shown as withdrawn. $8^e$ is a spring augmenting the wedge-spring at the blowing position.

Figure 6:
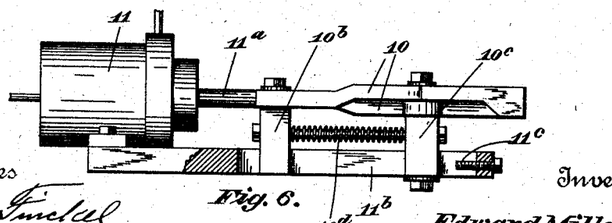
Fig. 6 is a detail in side view and partial section of the means for locking at their outer ends the blow-mold in closed position.
Figure 7:
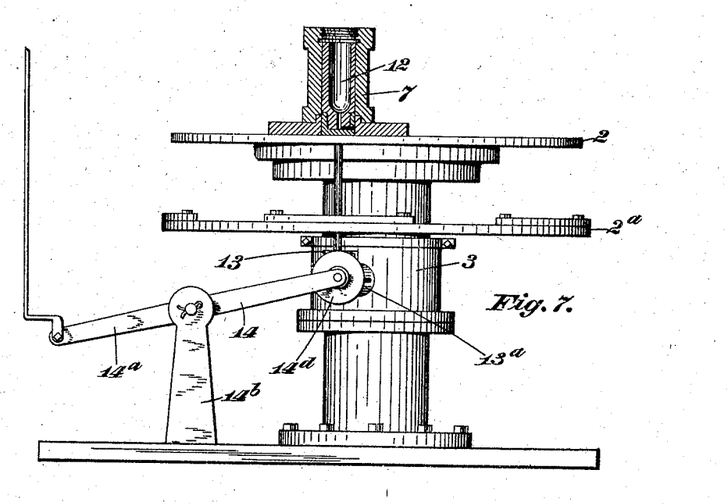
Fig. 7 is a detail illustrating in side view the means for elevating the primary blow-mold bottom.
Figure 8:
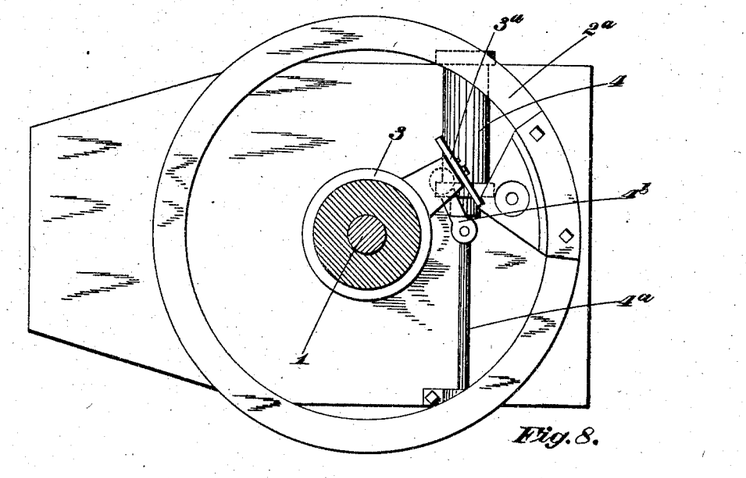
Fig. 8 is a plan view with parts omitted looking down from the plane $zz$, Fig. 1, to show the means for rotating the blow-mold carrier or table.
Figure 9:
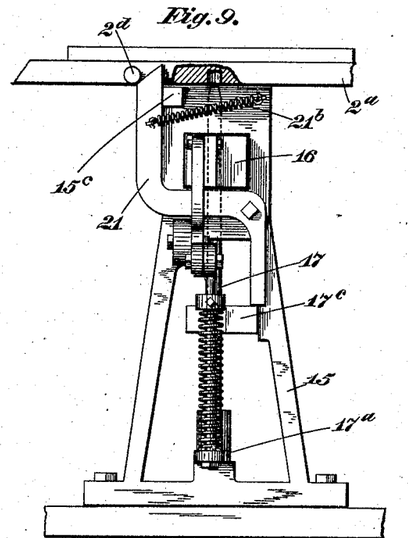
Fig. 9 is a detail in outer view and partial section, showing the carrier-locking and primary-bottom-supporting devices.
Figure 10:
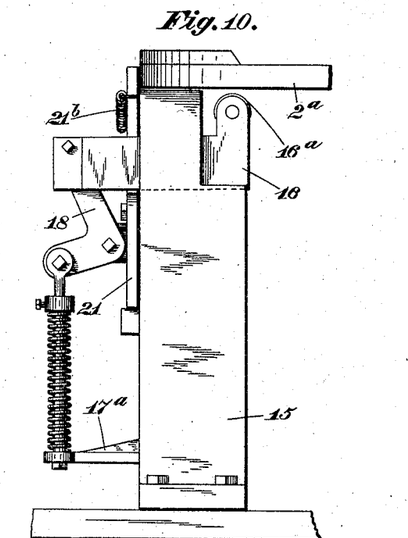
Fig. 10 is a side elevation of what is shown in Fig. 9.

When the plunger 5 comes down into the mold for the purpose of shaping the hot glass about the neck of the mold and to form a cavity prior to the blowing operation, it is important that the blow-mold sections be held quite tightly together. To effect this purpose, I provide, in addition to the wedges 8, means for locking the mold-sections at their outer ends at the point on the table where the plunger operates. This means, as shown, comprises a pair of pincer-levers 10, having the ends of their inner arms formed as jaws adapted to engage lugs $7^c$ on the outer ends of the blow-mold sections. The outer arms of the pincer-levers 10 are coupled by toggle-links $10^a$ to a head piece or slide $10^b$ on the end of a piston-rod $11^a$, which last is worked directly by an air-cylinder 11. The pincer-arms 10 are pivoted on a post $10^c$, (see Fig. 6,) and this and the slide $10^b$ are reciprocated by the piston-rod $11^a$ in a slotted piece $11^b$, the pincer-arms being of course carried with them. Between the slide $10^b$ and the post $10^c$ is a spring $10^d$, tending to push them asunder, and thus to maintain in normally separated position the inner or clamping ends of the pincer-levers; but the inner end of the slotted plate 11 is furnished with an adjustable stop-screw $11^e$, against which the post $10^c$ abuts when the pincer-levers are first pushed inward by the piston-rod $11^a$ and which holds them from further inward movement, while the piston-rod by its further inward stroke closes (through the toggle-links) the jaws upon lugs $7^c$ of the mold. Thus it will be observed that the pincer-levers are moved bodily toward and from the molds, the object of the outward or withdrawing movement being to remove the clamping-jaws from the path of the mold when it is to be moved to its new position under the blower and the charged mold moved into position under the plunger.

12 designates the "primary mold-bottom," so called because it constitutes the bottom of the mold when the glass is first acted on in the mold—that is, by the plunger 5. There will of course be five of them, one for each of the molds. They are, as before stated, carried by the ring $2^a$ and are lifted into the molds held supported therein while the molten glass is supplied or charged and afterward pressed and dropped out of the molds after the pressing operation by the mechanism which I will now proceed more particularly to describe. On the rotary reciprocating collar 3 is what might be called the "primary-bottom deliverer," consisting of a small shelf or bracket 13, having a shank $13^a$, that is supported and has a limited play in socketed bearing $13^b$, protruding from the collar 3. The shank $13^a$ is backed by a spring concealed in the bearing $13^b$, that tends to hold the bracket 13 yieldingly outward. Pivoted between suitable standards $14^b$ is what might be called the "primary-bottom lifter." This is a lever composed of two parts 14 and $14^a$, held together in normal relation by a coil-spring $14^c$, but so that the part 14 is yielding with respect to the part $14^a$ downward only. The part 14 extends under the primary bottom-carrier $2^a$ and contains a roller $14^d$, a point on the rim of which lies partially in the path of the lower end of the stem of the primary bottom, so that when said stem is brought by the ring $2^a$ over the roller its end rests or lies partially thereover. Therefore when a primary bottom with its stem is brought by the ring $2^a$ into position over or upon the roller $14^d$ and the plunger is depressed the primary bottom is lifted into the mold and into position to be taken by the spring-held bracket or shelf 13, which when the ring $2^a$ is again moved takes the stem and primary bottom thus elevated to the next position—that is, the glass-pressing position—it being understood that the mold was charged with hot glass after the primary bottom had been raised by the lifter-roller $14^d$.

Figure 11:
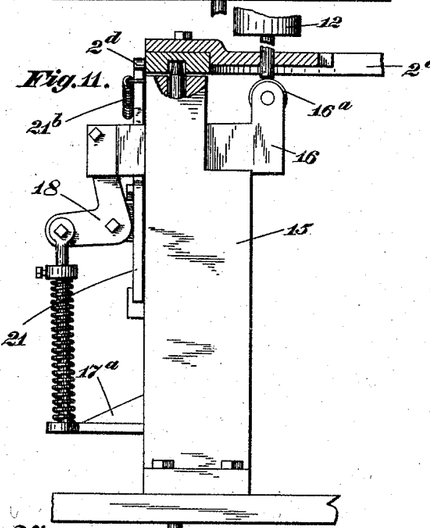
Fig. 11 is a side and sectional view showing the same parts as are shown in Fig. 9, but depicting the primary-bottom support in supporting position.
Figure 12:
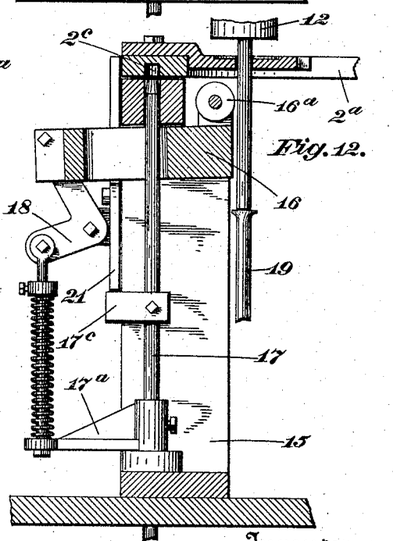
Fig. 12 is a sectional view of the same, showing the table unlocked and the primary-bottom support withdrawn from supporting position.
Figure 13:
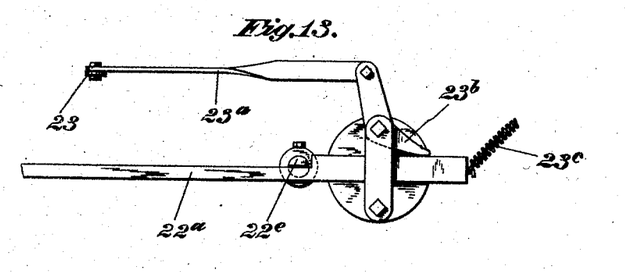
Fig. 13 is a plan view, on a large scale, looking up at the devices for operating the valve of the plunger-piston.
Figure 14:
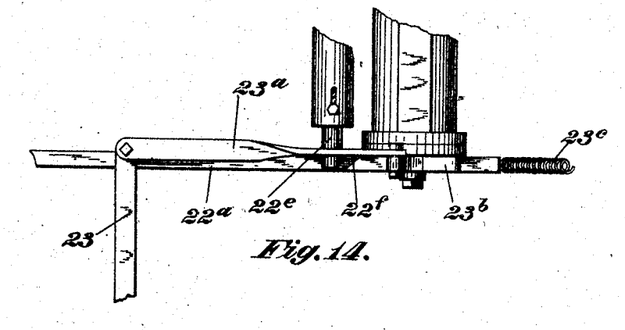
Fig. 14 is a side elevation of the same.

I shall next proceed to describe the means for supporting the primary bottom while the plunger descends and the means for locking the table during this operation. Arranged under the ring $2^a$ at the point where plunger operates is a standard 15, having in its upper portion an inclined bearing on which rests and slides a block-like structure 16, carrying at its inner end a roller $16^a$, adapted to be moved into and out of position to support the primary bottom. Passing up through the standard 15 and a slot in the block 16 is a rod 17, attached to which is a bracket-arm $17^a$, and between the extremity of the arm $17^a$ and the outer end of the block 16 is a bell-crank lever 18, pivoted on the standard, one arm of said bell-crank being attached to the block and the other having a suitable yielding connection with the arm $17^a$, so that the block 16 when pressed inward by the upward movement of the arm $17^a$ shall accommodate itself to variations in the resistance offered by the lower end of the primary bottom due to variations of expansion and contraction in both primary bottom and blow-mold. When a charged blow-mold is carried around to position under the plunger, it will be remembered that the primary bottom is also carried around with it while held in raised position therein by the shelf 13. When the rod 17 is lifted, the block 16 is moved inward and the roller $16^a$ dislodges the shelf 13 from under the shank of the primary bottom and itself performs the function of supporting the primary bottom, as seen in Fig. 11. The shelf 13 being fixed on the sleeve 3 is returned to bring the succeeding bottom when the table is again rotated. When the rod 17 is depressed, as hereinafter described, the roller $16^a$ is withdrawn and the primary bottom descends by gravity, violence in its contact being obviated by means of a plunger-rod 19, cushioned in a dash-pot $19^a$.

The upper end of the rod 17 constitutes a bolt for locking the table 2 $2^a$, which is provided with five holes $2^c$, located at the proper intervals to lock the table when the molds arrive under the plunger. The lower end of the rod 17 is attached to a lever 20, fulcrumed at one end under the platform or truck on which the machine is supported and having attached at its other end a rod $20^a$, extending to a bell-crank lever $20^b$, pivoted on a post of the frame and held upward by a spring $20^c$.

Pivoted at $21^a$ on the face of the standard 15 is a bell-crank lever 21, having a tripping-arm extending upward into the path of the pins $2^d$, projecting from the rim of the table 2, and on the rod 17 is secured a stop-block $17^c$, adapted to coöperate with the lower arm of the bell-crank lever 21 to lock the rod 17 out of table-locking position.

A spring $21^b$, connected with the upper or trip arm of the bell-crank lever 21 and attached to the standard 15, tends to draw the lower end of that lever into position over the stop-block $17^c$ when the rod or bolt 17 is withdrawn from locking position; but the fixed stop $15^c$ on the standard 15 limits the throw of lower end of said lever 21 and holds the upper end thereof in proper position to be struck by the pins $2^d$.

The upper end of the vertical arm of the bell-crank lever $20^b$ is made with a cam projection $20^d$. On the stem or piston-rod $5^a$ of the plunger 5 is secured a horizontal arm $5^b$, carrying trip $5^c$ to act on the cam $20^d$ to depress the rod $20^a$, the lever 20, and therefore the rod 17. The trip $5^c$ is constructed and hinged to the arm $5^b$, so as to be yielding on the downstroke of the stem $5^a$, but unyielding and rigid on the upstroke—a construction well known in mechanism. The rod 17 therefore is depressed on the upstroke only of the plunger 5.

22 designates the air-cylinder, by means of which the piston-rod $5^a$, carrying the plunger 5, is operated, a rod $22^a$ being provided and connected with one arm of a bell-crank lever $22^b$, the other arm of which is connected, by means of a rod $22^c$, with the horizontal arm of the bell-crank lever $20^b$, so that the trip $5^c$ not only unlocks the table 2 $2^a$ and permits the withdrawal of the block 16 to drop the primary bottom, but also operates the rod $22^a$. The admission of compressed air to the cylinder 22 to raise the plunger is controlled by a lever 23, which operates an appropriate valve for that purpose, as hereinafter described.

The blower 6 is raised and lowered by compressed air admitted to a cylinder $6^a$, and blowing-air is admitted through the pipe $6^b$.

The compressed air for operating all the parts except the plunger is brought from a compressor through a pipe 24 to a two-way connection 25, containing a two-way valve provided with a handle 26, adapted to be worked by the attendant. From the two-way connection 25 appropriate pipes lead to the several air-cylinders 4, 11, and $6^a$. The cylinder 22 receives its compressed air through an independent pipe and connection $22^d$, the supply being controlled by a valve $22^e$. The valve $22^e$ simultaneously with the locking of the table is lifted by an incline or cam $22^f$ on the rod $22^a$ to admit compressed air to the upper end of the cylinder 22 to force the plunger down. The stroke of the plunger's piston is reversed by the attendant when he draws the lower end of the lever 23 to the left, thus through the medium of a rod $23^a$, attached to a bell-crank $23^b$, shifting the rod $22^a$ laterally and throwing the cam or incline $22^f$ thereon from under the valve $22^e$ and permitting the valve to drop by gravity to reverse the air in the cylinder 22 to lift the plunger. The cam or incline $22^f$ is restored to position to again lift the valve $22^e$ by means of a spring $23^c$, that draws the rod $22^a$ outward into proper line to lift the valve when the table is unlocked by the action of the dog $5^c$ on the bell-crank $20^b$.

The operation of the machine shown is briefly as follows: A lump of molten glass is first put into the mold that is at the charging position, said position being indicated by A in Fig. 3. At the time the mold is charged the primary bottom is up therein, being supported by the shelf 13, the plunger is also up, the blower is down in blowing position on a mold, the grip 10 is in mold-locking position, primary mold-lifting lever 14 is down, and the table is unlocked. The lever of the valve 26 is now thrown to the right, causing the grip 10 to be withdrawn, the blower to be lifted, and the table to be rotated through an arc of seventy-two degrees and automatically locked in the manner hereinbefore described. At the moment the table is locked the attendant reverses the lever 26, thus causing the grip 10 to lock the mold-sections, the blower to descend in the blow-mold below it, and the collar 3 to be restored to table-operating position. At the moment the table is being locked the plunger is automatically caused to descend, thus also lifting the primary bottom that has been brought by the rotated table into position above the roller $14^d$ onto the shelf 13. After a proper time has been allowed for the proper setting of the glass subjected to pressure the attendant moves the lower end of the lever 23 to the left, thus causing the plunger to rise, as before described. When the plunger approaches the limit of its upward stroke, the dog $5^c$ operates the bell-crank lever $20^b$ and unlocks the table and also releases the primary bottom. The attendant then shoves the secondary bottom (shown at 27, Fig. 3) into position under the pressed glass in the mold, after which the mold is moved to the next position—that is, under blower—and the other operations first described again concurrently performed.

It is obvious that some changes in the form, arrangement, and location of the parts can be made within the domain of mechanical skill and of course without departing from the substance of the invention.

What I claim, and desire to secure by Letters Patent, is—

1. In a glass-molding machine, the combination of a mold-carrier and molds thereon composed of hinged sections, means for engaging and locking the molds at their outer sides comprising a pair of hinged levers having clamping-jaws, and means for moving the levers inward and outward toward the molds and means for holding the levers in open position until their jaws are opposite the parts to be clamped, and means for arresting the inward movement of the levers while the moving means close the jaws.

2. In a glass-molding machine, the combination of a mold-carrier and molds thereon composed of hinged sections, means for engaging and locking the molds at their outer sides comprising a pair of levers having clamping-jaws 10, a sliding block $10^e$ on which said levers are pivoted, toggle-links $10^a$ and a block $10^b$ to which said toggle-links are connected, a stop $11^c$ and means for moving the levers, substantially as described.

3. In a glass-molding machine, the combination of a mold-carrier, and a circular series of molds thereon composed of hinged sections, and means for locking such mold-sections in closed position comprising radially-slidable keys adapted to engage the inner ends of the mold-sections.

4. In a glass-molding machine, the combination of a mold-carrier and a circular series of molds thereon composed of hinged sections, and means for locking such mold-sections in closed position comprising radially spring-held slidable keys adapted to engage the inner ends of the mold-sections.

5. In a glass-molding machine, the combination of a mold-carrier and a circular series of molds thereon composed of hinged sections and means for locking such mold-sections in closed position comprising radially-slidable keys and means for moving them toward and from locking position.

6. In a glass-molding machine, the combination of a mold-carrier, and a circular series of molds thereon composed of hinged sections, means for locking such mold-sections in closed position comprising radially-slidable spring-held keys, and means for moving them toward and from locking position.
7. In a glass-molding machine, the combination of a mold-carrier and a circular series of molds thereon composed of hinged sections, means for locking such mold-sections at their inner ends in closed position comprising arms or shanks for carrying the mold-locking keys, spring-held locking-keys in said arms, means for carrying said arms with the mold-carrier, and a cam to move said arms toward and from the molds while being carried, substantially as described.

8. In a glass-molding machine, the combination of a rotary mold-carrier and a circular series of molds thereon, a primary-mold-bottom carrier arranged below the mold-carrier, and primary bottoms in said last-named carrier, a glass-pressing plunger, means for moving the molds and bottoms successively into position under the plunger, means for lifting a primary bottom into a mold and supporting the same therein prior to its movement to position under the pressing-plunger, means for carrying the same in supported position to position under the plunger, and second a primary-bottom support adapted to displace the first-mentioned support when the glass-pressing plunger descends into the mold.

9. In a glass-molding machine, the combination of a rotary mold-carrier and a circular series of molds thereon, a primary-mold-bottom carrier arranged below the mold-carrier, and primary bottoms in said last-named carrier, a glass-pressing plunger, means for moving the molds and bottoms successively into position under the plunger, means for lifting a primary bottom into a mold and supporting the same therein prior to its movement to position under the pressing-plunger, means for carrying the same in supported position to position under the plunger a second primary-bottom support itself yieldingly supported adapted to displace the first-mentioned support when the glass-pressing plunger descends into the mold.

10. In a glass-molding machine, the combination of a rotary mold-carrier and a circular series of molds thereon, a primary-mold-bottom carrier arranged below the mold-carrier and primary bottoms in said last-named carrier, a glass-pressing plunger, means for moving the molds and bottoms successively into position under the plunger, a lock for the carriers, a movable support for the primary bottoms operated by said lock, and a trip operated by the table to latch said lock out of table-locking position, substantially as described.

11. In a glass-molding machine, the combination of a rotary table to receive a circular series of blow-mold sections, means for rotating said table, means for locking the blow-mold sections together at their outer ends, and a blow-head, means adapted to be operated one way for automatically rotating the table, unlocking the blow-mold sections and causing the blow-head to rise from a blow-mold, and said means being adapted to be operated another way to automatically lock the blow-mold sections together, cause the blow-head to descend onto a blow-mold, and restore the table-rotating means to table-rotating position.

12. In a glass-molding machine, the combination of a mold-table, means for intermittently rotating the same, a reciprocating plunger to press the glass in molds on said table, and devices independent of the plunger for locking said table with means to be operated by said plunger to unlock the table.

13. In a glass-molding machine, the combination of a mold-table, means for intermittently rotating the same, locking devices for the table, a glass-pressing plunger and fluid-pressure cylinder for operating the same, a shiftable valve device therefor, and means for operating the table-locking and valve-shifting devices by the plunger.

14. In a glass-molding machine, the combination with a mold-table, means for intermittently rotating the same, locking devices for the table, a glass-pressing plunger and fluid-pressure cylinder for operating the same, a shiftable valve device therefor, means operated by the plunger for operating the table-locking device and for automatically rearranging the valve-shifting device to move the same into valve-shifting position.

15. In a glass-molding machine, the combination with the mold-table, and means for intermittently rotating the same, a glass-pressing plunger, a fluid-pressure cylinder for operating the glass-pressing plunger and a valve-shifting device for said cylinder, means operated by the plunger for automatically rearranging the valve-shifting device to place the same in valve-shifting position.

In testimony whereof I affix my signature in presence of two witnesses.

EDWARD MILLER.

Witnesses:
   E. M. HELWAGEN,
   ODA ECKSTEIN.